April 1, 1941.　　　　J. N. BLANK　　　　2,236,787
CASING FOR ELECTRICAL INSTALLATIONS
Filed June 7, 1928　　　　4 Sheets-Sheet 1
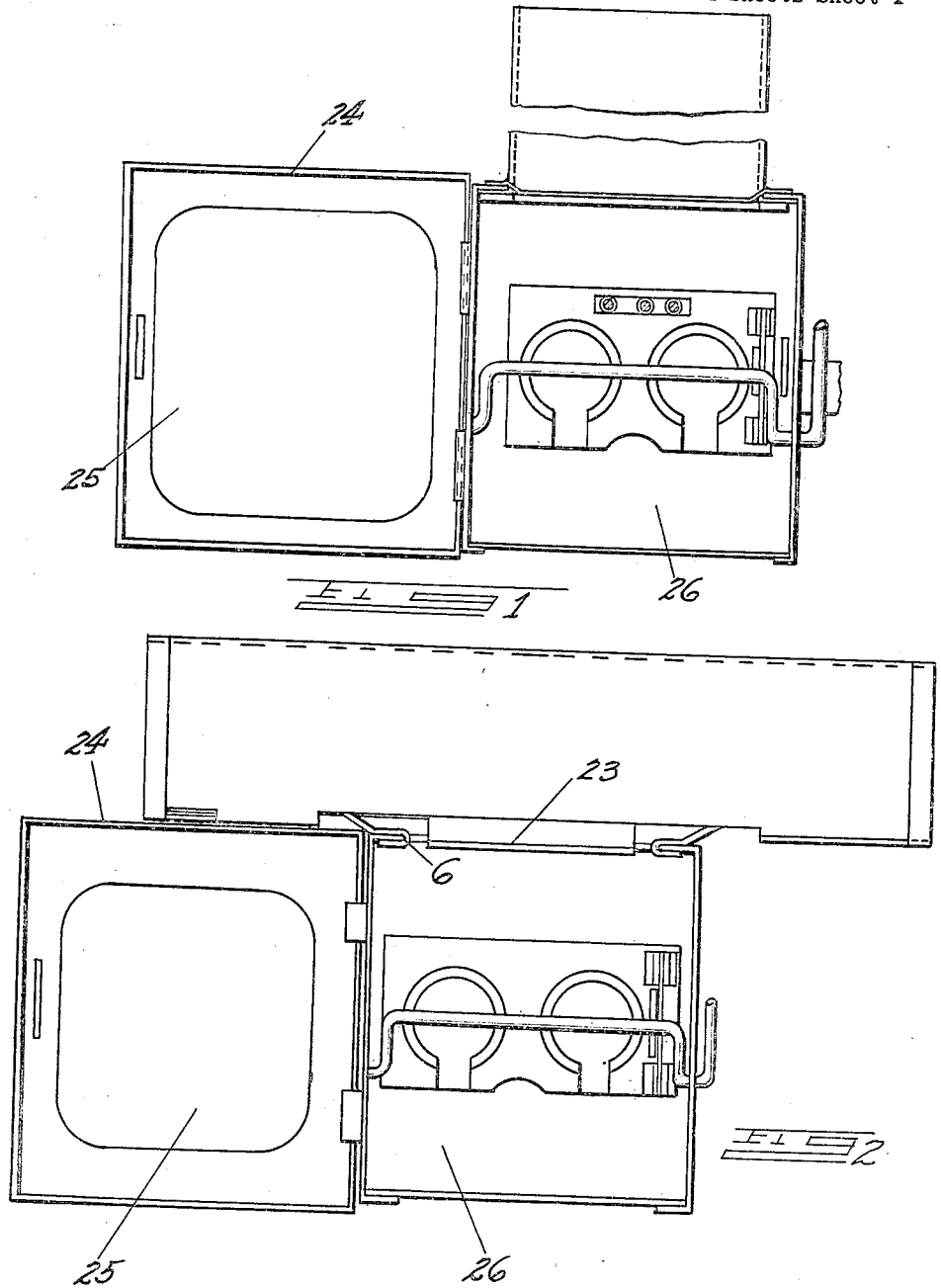
INVENTOR.
Joseph N. Blank
BY
ATTORNEY.

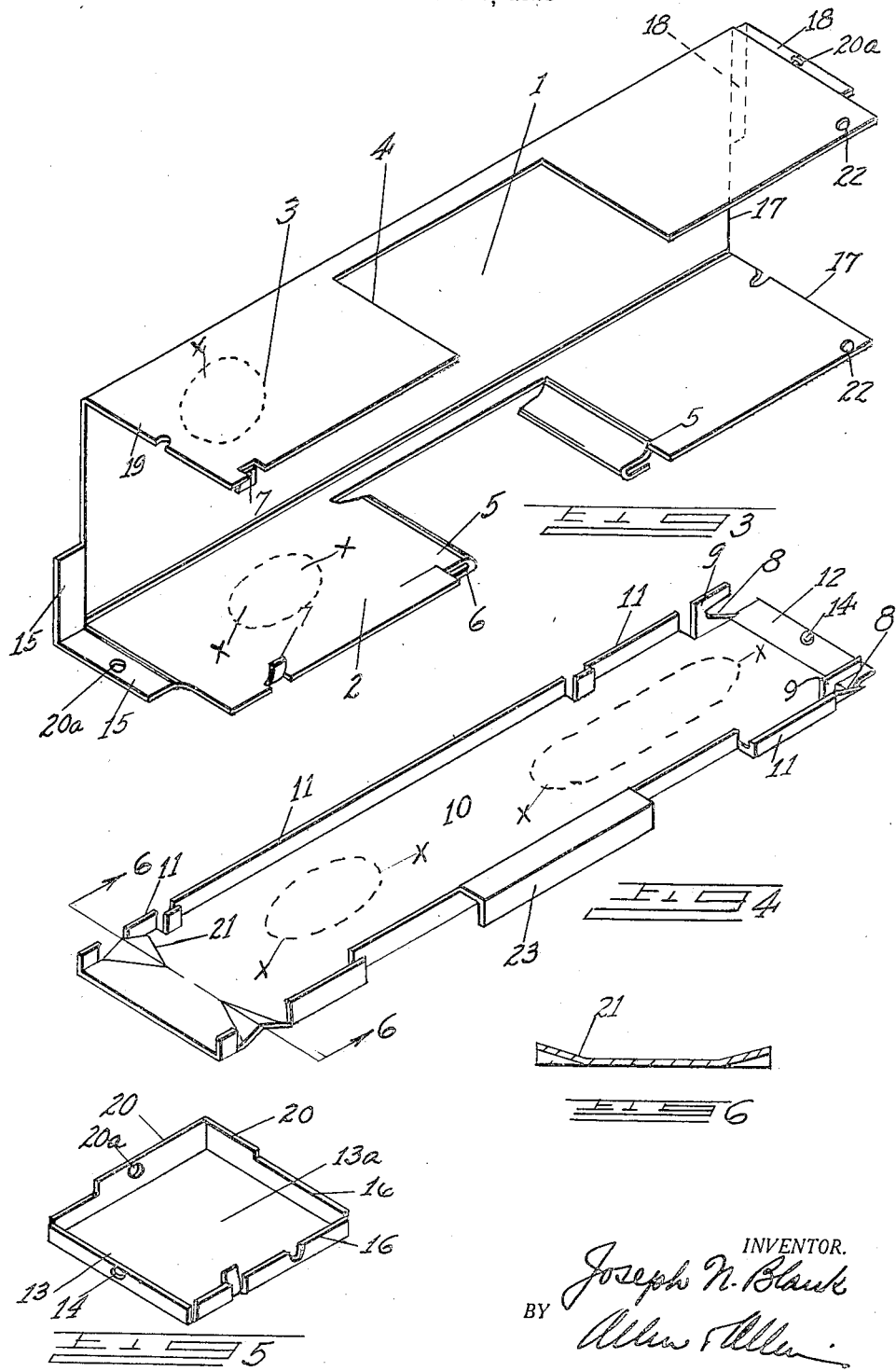

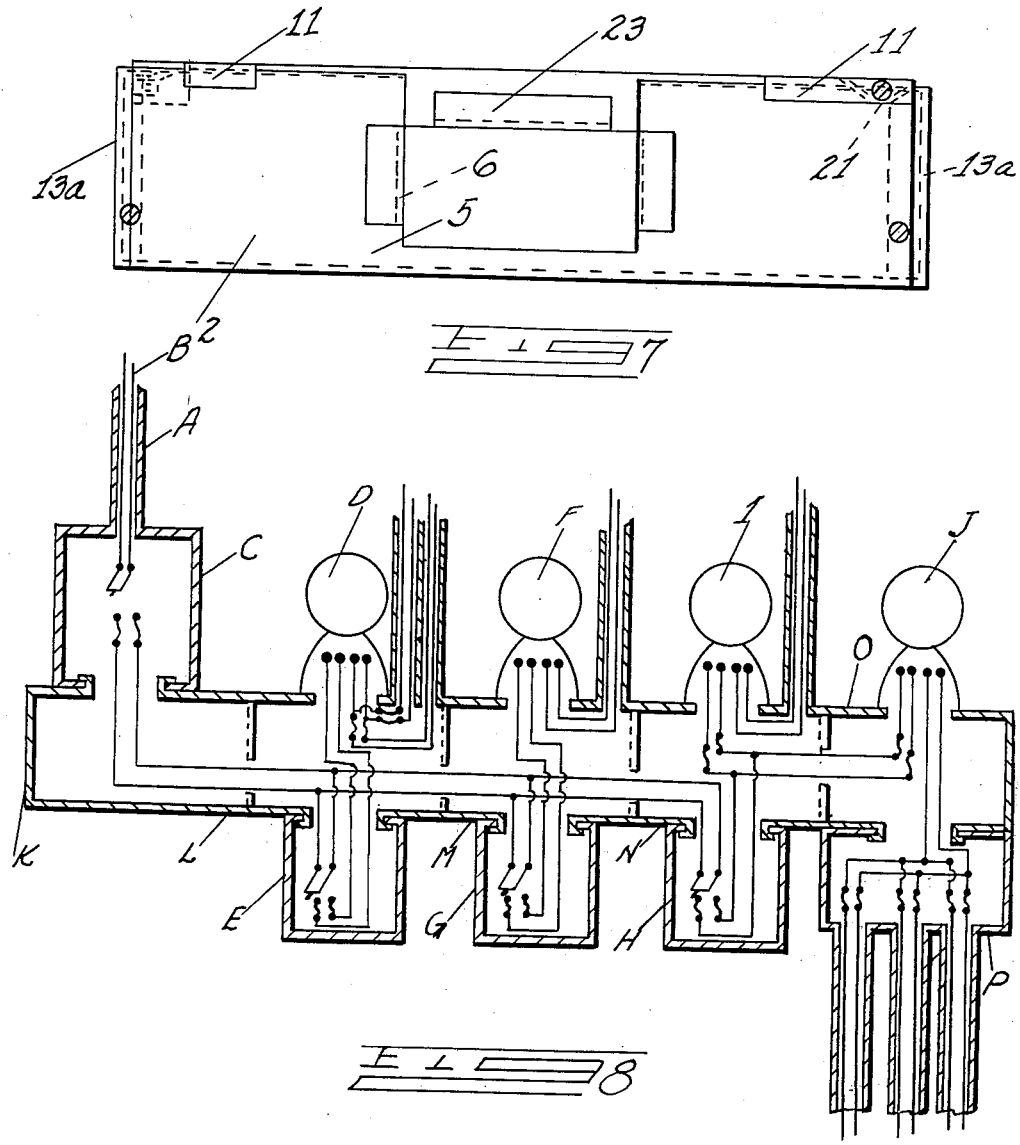

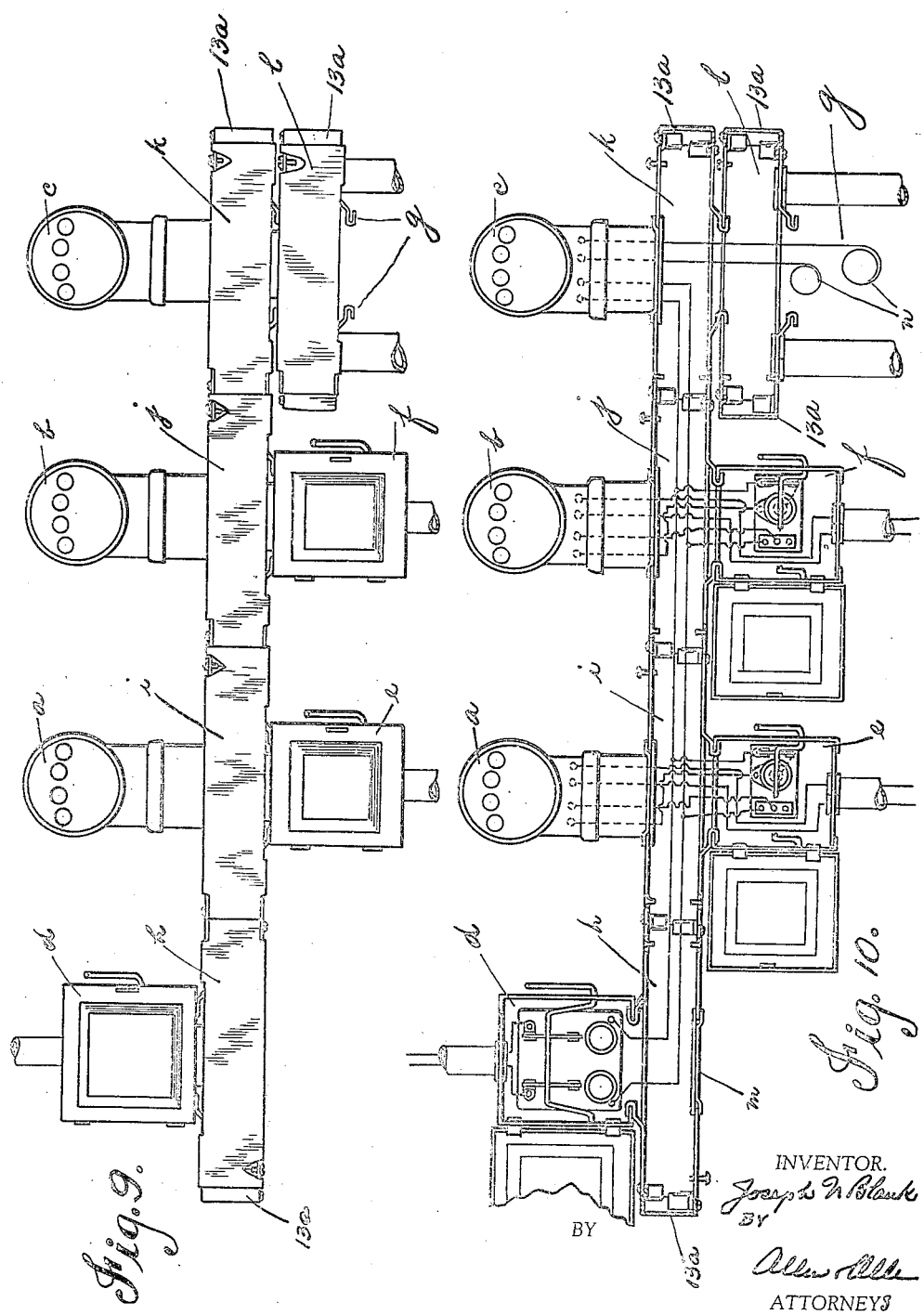

Patented Apr. 1, 1941

2,236,787

UNITED STATES PATENT OFFICE 2,236,787

CASING FOR ELECTRICAL INSTALLATIONS

Joseph N. Blank, Newport, Ky., assignor to The Wadsworth Electric Manufacturing Company, Covington, Ky., a corporation of Kentucky Application June 7, 1928, Serial No. 283,688

1 Claim. (Cl. 175—221)

My invention relates to casings for electrical installations such as are commonly referred to in the art as electric wiring raceways and cabinets.

It is the object of my invention to provide a casing composed of a base or channel member having removable side and end lids which will permit the casing to be utilized for a variety of purposes, depending on the nature of the electrical installation to be made.

Specifically it is the object of my invention to provide a base member to which side and end lids are so attached that the device may be used in some instances as a raceway, in other instances as a cabinet. It is further my object to provide end lids which will be reversible, and which, when removed, will permit a desired number of base members to be attached together. Another object is the provision of an attaching device which will permit the casing to be readily applied to an opening such as the meter slot of a switch box. As these meter slots are of standard size in most boxes now on the market, this enables the ready attachment of the casing in the position in which it is frequently used without requiring any additional labor in installing it. While the meter slot connections are at present of standard size, I contemplate the change in the size and shape of my connecting attaching mechanism with the change in commercial standards.

The above and other objects to which reference will be made in the following description I accomplish by that certain combination and arrangement of parts of which I have shown a preferred modification.

Referring to the drawings:

Figure 1 is a front elevation of a switch box, showing the standard meter slot to which we have referred and with a meter trim or adapter connected in the slot.

Figure 2 is a front elevation of a switch box with my novel casing connected in the meter slot.

Figure 3 is a perspective view of my novel casing.

Figure 4 is a perspective view of the lid of the casing shown in inverted position.

Figure 5 is a perspective view of one of the end pieces.

Figure 6 is a detail sectional view taken along the lines 6—6 in Figure 4.

Figure 7 is a front elevation of the casing with the cover and lids at each end indicated.

Figure 8 is a wiring diagram showing an electrical wiring installation which might be installed in an apartment building and in which a number of the different arrangements in which the casing may be used illustrated.

Figure 9 is a front elevation of the installation shown diagrammatically in Figure 8.

Figure 10 shows in front elevation the installation shown in Figure 9, with a slightly modified wiring diagram indicated.

The casing is ordinarily stamped out of a metal blank and is in the shape of a channel. There is a bottom wall 1 with side walls 2 and 3. The wall 3 is provided with a standard sized opening 4 which is of similar size and shape as the meter slot in most switch boxes. The wall 2 may have outwardly bent portions 5 with guiding slots 6 formed by bending the edges of the portions over as indicated in Figure 3 into channels. One end of the inner walls of the casing is provided with lugs 7 which will engage slots 8 formed into downwardly bent tongues 9 of the lid or cover 10 when the cover is applied in an inclined position, with a slight movement lengthwise of the casing.

The lid has its side edges flanged down at right angles to the main body of the lid. In order to provide flanged sides which will fit snugly on the base sections, the downturned flanges are split from the main body of the flanged portions and extended outwardly to form channels such as are indicated at 11. The cover is provided at one end with an offset projecting ledge 12 which will permit the ledge of one cover to fit snugly within an unoffset flanged wall 13 of one of the end lids 13a. The offset ledge may be secured to the wall 13 of an end cover as with a screw which engages registering threaded apertures 14. The side and bottom walls of the casing at one end have offset ledge portions 15 which will overlap and register either with unoffset portions 16 of the flanged walls of the end covers, or with unoffset portions 17 of the end wall at the other end of the casing. The other end of the casing is also provided with offset ledges 18 which will fit either within the unoffset walls 13, 16 of an end lid, or within the unoffset wall 19 of the opposite end wall of another casing. The end lids also have offset ledges 20 which will permit enough overlapping of the parts to provide a firm seat and also to secure the parts together as with screws passing through threaded openings 20a in the overlapping portions of the cover and end lids.

It will thus be observed that the covers and end lids for the casing are interchangeable and reversible. A dealer only needs to carry in stock one type of cover, one type of casing, and one type of end lid. Since the ends of the casing are what might be termed offset in a complementary manner, the casings can be engaged one with another, or an end lid may be installed in a right hand position at the left end of a casing or in a left hand position at the right end of a casing.

The attachment of the cover and casing is provided at one end by the engagement of the slotted portions 8 over the lugs 7. At the other end of the cover the metal is cut away and bent down in inclined V-shaped depressions as indicated at 21, so that when a screw is inserted through the openings 22 in the side walls the further the screws are advanced up the inclines of the depressions the tighter the cover will be drawn down onto the casing.

At one side of the cover the metal is extended to form an inverted channel 23 which will interlock with the edges 24 of the hinged lid 25 of a standard switch box 26. Since the switch boxes are ordinarily locked until the occupant of the premises has taken possession, there is no danger that current will be stolen as the cover of the casing will be as securely fastened in position on the casing as the door of the switch box will be fastened on the box.

Since one of the walls 2 of the casing is provided with the vertical channels 6, and since the opposite wall 3 of the casing has a standard meter slot connection, the casings may be attached side to side whenever such installation becomes necessary.

In the diagram in Figure 8 I have indicated several of the many different uses for which my novel device is adaptable. While I have, for purposes of illustration, indicated only one simple set of installation conditions, I do not wish to be limited to the specific arrangement which I have suggested as many other uses will occur to the electrician using the device without additional explanation.

I have indicated a conduit A through which the main feeders B are connected to the terminals in the main switch box C. I have shown four typical installations and have indicated each one by a different letter. Thus I have shown at D the meter for the service switch E. At F I have shown the meter for the service switch G. At H I have indicated the service switch for the two meters I and J. The connections for the different wires, fuses, switches, etc., will be apparent from an examination of the wiring diagram.

The casing which, with its covers and end lids, forms the subject matter of the invention described herein, is used in the installation described first as a spacer K in which it is secured in inverted position to an opening in the base of the main switch box. The casings connected end to end, and indicated at K, L, M, N, and O, are then used as a bank to replace the conduits which would ordinarily be used and which would require separate cutting of the conduits and the fishing of the wires through the conduits. With my casing all the wires may be laid in. The casings L and N are used both as spacers and fuse cabinets, as will be apparent. The casings L, M, and N are used to connect in the meter slots of the switch boxes E, G and H. A fuse box is indicated at P which, however, is nothing more than one of the casings connected with its meter slot in the guides of the casing O and with fuse receptacles on the back wall of the casing. The casing O is used both as a meter connector and a fuse cabinet.

The front covers may be provided with either blank surfaces or having openings in which electrical apparatus may be mounted or which will either allow the protruding of devices mounted in the casing or make them accessible through the openings. When the casings are not used for switch box connections and are used for meter connections, as in case of the use shown of the casing O, the unused openings may be closed with suitable blanks.

From the foregoing it will be obvious that the possibilities of use for my novel casings and covers and end lids are multifarious. I have indicated by the circular dotted lines X, X in the covers and casing shown in Figures 3–5 various arrangements of portions which may be punched out to provide openings for conduits and the various purposes suggested. The provision of such weakened portions is so well known in connection with switch box construction that it is not thought that further reference need to be made to this feature other than its suggestion. The back wall of the casing may also be provided with threaded openings for retaining fuse receptacles or the like, or for fastening the casing with screws to a wall which will support the casing.

In Figures 9 and 10 I have shown a three meter service installation in which the casings $h$, $i$, $j$, and $k$ are joined together by means of the interlocking of the portions 15, 17, and 18, located at the initially open ends of the casings, thereby forming a continuous unbroken conductor housing. At $d$ I have indicated a main service switch connected with the casing $h$, through which the current may pass before feeding the conductors in the connected casings $h$, $i$, $j$, and $k$. At $a$, $b$, and $c$, I have shown a series of electric meters horizontally spaced, and the cabinets of these meters protectively associated with the casings $i$, $j$, and $k$. At $e$ and $f$ are shown the externally operated meter service protective appliances and cabinets mechanically connected with the casings $i$ and $j$.

At $l$ I have shown one of my casings engaging the bottom of the casing $k$, thus providing a plurality of parallel horizontal conduits or cabinets to provide additional horizontal wire-ways or housings for various purposes as needed. It will be noted that the initially open sided ends are closed by means of the closures 13a, which, however, may be removed and additional similar casings connected as required.

At $g$ in Figure 9, I have shown the opening and connecting means for engaging the individual meter service appliance cabinet (not shown) for the meter $c$.

In Figure 9 the front closures or covers for my casings are shown closed, as are also the independently operable front closures for the appliance cabinets $d$, $e$ and $f$.

The meter protective association means and the appliance cabinet engaging means have the same horizontal spacing and coincide vertically on different walls of the connected casings, to provide for relative identification of the electrically associated meters and meter service protective appliances when all front closures are in position, and the connections are inaccessible by reason of said closures.

In this type of installation it is customary to identify the meter and service equipment of each consumer, such as "Apt. #1" etc. Thus, if either one of the component units as a, i or e were designated "Apt. #1", the electrical association of these units in combination would be obvious because of the vertical disposition of said units a, i and e.

This identification is further provided by means of the plurality of front closures, as shown in Figure 9. Each front closure is adapted to close the open front of the casing base member for a distance equal to the spacing on centers of the appliance cabinet engaging devices, and it is further adapted, when displaced, to provide accessibility to the conductors, and the connections thereto, and to one of the meters and the meter service appliance associated therewith.

In Figure 10 there is shown the same installation shown in Figure 9, with the front closures of the main service switch cabinet d and the individual meter service appliance cabinets open, and the front closures for the casings h, i, j, k and l removed.

It will be noted that the connected casing base members form a continuous open front trough, open and substantially unobstructed across a part of the distance between the top and bottom walls from the front to back wall, and from one side end cover 13a to the opposite side end cover 13a.

Since the connecting means at the sides of the casings are alike and oppositely formed on opposite sides, a casing may be installed inversely as shown at "h" in respect to the adjacent connected casing i.

Since in the latter instance the enclosed switch connected with the casing base h is used as a master service switch, and since there is no corresponding oppositely disposed master meter, the unused opening in the casing base is closed with a suitable blanking plate m.

The meters a, b, and c, are shown protectively associated with the casing bases by means of an extended meter trim similar to that shown in the switch box in Figure 1.

Referring to the casing i, it will be noted that the meter a is protectively associated with one wall of the casing, while on the opposite side wall and oppositely disposed therefrom is the opening and the means engaging the individual meter service appliance cabinet e.

The casing at j shows a similar combination. The use of the casing as shown at k is substantially the same as that of the casings i and j.

The meter c is protectively associated with one of the walls of the casing k and on the opposite side wall and oppositely disposed therefrom is the opening and cabinet engaging means used, in this instance, to engage the normal meter opening in the casing l. Further, in the opposite side wall of casing l and oppositely disposed from the said latter opening, is the opening and means to engage the individual meter service appliance cabinet for the meter c.

The casing l is connected to show the possibilities where multiple horizontal troughing means is required, and that regardless of the number of parallel casings required or used, the oppositely disposed, outer walls of the parallel combinations provide the same functional possibilities as when a single series of casings are used, such as are indicated at i and j. It will also be noted that when casings are connected in a parallel arrangement as at k and l, an open front passage is provided transversely through such parallel combinations and extending from the meter c to the cabinet to be attached at g.

The wiring and connections disclosed in Figures 8 and 10 are only intended to show the electrical association of unlike units in a series of separately metered combinations, and I do not limit myself to the specific arrangement shown. For example, the wiring shows that the meter a is electrically associated with the individual meter service appliance e, forming a complete separately metered service combination.

When the casing and appliance cabinet front closures are displaced, as in Figure 10, these electrically associated combinations are easily identified by the connections. Means as described in Figure 9 may be provided for identifying these electrically associated combinations when all front closure means are in place.

Having thus described my invention, what I claim as new and desire to secure by Letters Patent, is:

In combination a series of closable U-shaped wiring channel elements having apertures and free and open end to end communication, apertured cabinets disposed above and below said elements and means including the cabinet and element structure for effecting removable and communicating connection through the apertures of the cabinets and elements.

JOSEPH N. BLANK.